(12) United States Patent
Speak et al.

(10) Patent No.: US 9,890,704 B2
(45) Date of Patent: Feb. 13, 2018

(54) COMPRESSOR SYSTEM

(71) Applicants: DERWENT AVIATION CONSULTING LTD., Staffordshire (GB); Trevor H. Speak, Gloucestershire (GB); Robert J. Sellick, Gloucestershire (GB)

(72) Inventors: Trevor H. Speak, Gloucestershire (GB); Robert J. Sellick, Gloucestershire (GB)

(73) Assignee: Derwent Aviation Consulting Ltd., Staffordshire (GB)

( * ) Notice: Subject to any disclaimer, the term of this patent is extended or adjusted under 35 U.S.C. 154(b) by 316 days.

(21) Appl. No.: 14/785,628

(22) PCT Filed: Apr. 1, 2014

(86) PCT No.: PCT/GB2014/051024
§ 371 (c)(1),
(2) Date: Oct. 19, 2015

(87) PCT Pub. No.: WO2014/177836
PCT Pub. Date: Nov. 6, 2014

(65) Prior Publication Data
US 2016/0069260 A1    Mar. 10, 2016

(30) Foreign Application Priority Data

May 1, 2013  (GB) .................................. 1307894.4

(51) Int. Cl.
*F01D 15/12*  (2006.01)
*F02C 3/107*  (2006.01)
(Continued)

(52) U.S. Cl.
CPC .............. *F02C 3/107* (2013.01); *F02C 3/067* (2013.01); *F02C 3/34* (2013.01); *F02C 7/36* (2013.01);
(Continued)

(58) Field of Classification Search
CPC .......... F01D 15/12; F02C 3/067; F02C 3/107; F02C 7/36; F02K 3/06; F05D 2260/40311
See application file for complete search history.

(56) References Cited

U.S. PATENT DOCUMENTS 4,751,816 A * 6/1988 Perry ..................... F02K 3/072
416/129
5,010,729 A * 4/1991 Adamson ............... F02C 3/067
416/129

(Continued)

FOREIGN PATENT DOCUMENTS

DE  3933776 A1  4/1991
EP  2233721 A1  9/2010

(Continued)

OTHER PUBLICATIONS

International Search Report for PCT/GB2014/051024 dated Jul. 23, 2014.
Written Opinion for PCT/GB2014/051024 dated Jul. 23, 2014.

*Primary Examiner* — Ninh H Nguyen
(74) *Attorney, Agent, or Firm* — TannerIP PLLC; Daniel A. Tanner, III; James E. Golladay, II

(57) ABSTRACT

In a gas turbine engine, the booster compressor is driven by both the low pressure or fan shaft and high pressure shaft through a differential gear arrangement. The rotational speed of the booster compressor is intermediate between the speed of the fan and the speed of the high pressure compressor.

16 Claims, 4 Drawing Sheets

(51) Int. Cl.
*F02K 3/06* (2006.01)
*F02C 3/067* (2006.01)
*F02C 7/36* (2006.01)
*F02C 3/34* (2006.01)

(52) U.S. Cl.
CPC ............ *F02K 3/06* (2013.01); *F05D 2220/36* (2013.01); *F05D 2220/62* (2013.01); *F05D 2260/40311* (2013.01); *Y02T 50/671* (2013.01)

(56) References Cited

U.S. PATENT DOCUMENTS

| | | |
|---|---|---|
| 7,363,757 B2 * | 4/2008 | Loisy ................. F02C 3/113 60/226.1 |
| 9,726,186 B2 * | 8/2017 | Masson ................... F04D 25/00 |
| 2008/0098713 A1 | 5/2008 | Orlando et al. |
| 2012/0171018 A1 | 7/2012 | Hasel et al. |
| 2013/0000323 A1 | 1/2013 | Kupratis |

FOREIGN PATENT DOCUMENTS

| | | |
|---|---|---|
| EP | 1936238 B1 | 4/2013 |
| EP | 2728140 A2 | 5/2014 |

* cited by examiner

COMPRESSOR SYSTEM

The present disclosure relates to a compressor system.

In particular the disclosure is concerned with a fan and low pressure compressor system for a turbo machine.

Turbo machinery, in particular gas turbine engines, may comprise, in series, a fan, a booster compressor and a high pressure compressor which deliver pressurised air to a core of the turbo machinery, for example a combustor unit, where fuel and air combust and are exhausted to a series of turbines to drive the fan and compressor units, as well as providing thrust. Such an arrangement is shown in FIG. 1, which is an extract from U.S. Pat. No. 7,624,581.

In response to the need for greater fuel efficiency, gas turbine engines having higher bypass ratios and higher overall pressure ratios have been produced. The next generation of engines continue this trend, which results in an increased conflict between the optimum design parameters for the fan and the core engine. At higher bypass ratios the optimum fan pressure ratio is relatively low, which results in lower rotational speed and higher fan shaft torque. Booster stages coupled to the fan shaft rotate more slowly and require more stages to achieve the desired pressure ratio or require an increased radius which affects the fan hub line and results in an increased fan tip diameter with adverse consequences on engine weight and drag. To minimise these effects it is desirable to achieve the maximum pressure ratio in the core engine, but this requires very advanced aerodynamic technology, high temperature materials and advanced cooling technology to achieve a compact core design which can accommodate the high torque fan shaft.

Geared fan engines have been proposed that address the booster aerodynamic issues and high fan shaft torque, but require the gear train to be able to cope with very high fan and booster power levels with the attendant difficulties in achieving satisfactory weight, reliability, cost and oil system heat management.

Geared fan arrangements provide fans driven from, for example, a low pressure shaft via a gear box such that the rotational speed of the low pressure turbine is higher than the fan, reducing the weight and reducing the aerodynamic loading of the low pressure turbine. Such arrangements can provide higher by-pass ratios than conventional turbofans within the same nominal nacelle diameter. Geared fans are configured to transmit very high power through their gearbox, which consequentially must be of a substantial design, thereby adding considerable weight and cost to the engine, and thus offsetting the advantage from the low pressure turbine.

In a two-shaft turbofan it is also known to attach a booster compressor directly to the fan shaft such that the booster rotates at the same speed as the fan. At higher bypass ratios, the blade speed of the booster is very low and may require many stages to achieve the required pressure ratio. To achieve acceptable booster aerodynamic loading in such a configuration, several booster stages may be required, and each booster stage must achieve sufficient blade speed, which requires the diameter of each booster stage to be relatively large. Both of these design characteristics increase the overall size of the resultant engine, which results in extra weight and aerodynamic drag. The shaft which drives the fan and booster must also be sized to deal with the torque load of the booster and fan, further increasing the weight and size of such design variations.

An alternative arrangement is described in U.S. Pat. No. 8,209,952, and shown in FIG. 2. Using the reference numerals of U.S. Pat. No. 8,209,952, a fan stage 51 is coupled to a low-pressure turbine 103 by a low pressure shaft 64. An intermediate speed booster 54 is provided, driven by an epicyclic gear train 56. The epicyclic gear train provides for contra-rotation of the compressor boost stages 54 relative to the fan stage 51. Such a configuration may result in a lower number of required booster stages or reduced booster stage diameter, but if higher booster pressure ratios are required for more advanced engine thermodynamic cycles, provides an extra load on the fan shaft which requires the shaft to be reinforced with extra material to accommodate the load, and hence increases the overall weight and adversely impacts the core engine mechanical design.

Booster compressors which rotate at a fixed gear ratio relative to the fan suffer from poor aerodynamic matching at off-design conditions and generally require large quantities of air to be bled into the bypass duct at off-design conditions to avoid surge. This reduces the overall efficiency of the engine at these off-design conditions.

Hence a system which provides an increased compression ratio for the same or lower booster compressor diameter and number of booster stages than a conventional arrangement, and which and keeps load on the engine low pressure shaft to a minimum, is highly desirable. Also a system which drives the booster compressor at a rotational speed which is a function of both the speed of the fan and the speed of the high pressure compressor is highly desirable, particularly if that function can be optimised to match the aerodynamic performance of the compressors.

SUMMARY

According to the present invention there is provided an apparatus and system as set forth in the appended claims. Other features of the invention will be apparent from the dependent claims, and the description which follows.

Accordingly there may be provided a fan and booster compressor system for a turbo machine comprising: a first shaft and a second shaft; a fan comprising an array of blades coupled to the second shaft; and a booster compressor comprising an array of compressor rotor blades; wherein the first shaft is coupled to a first input member of an epicyclic gear unit; the second shaft is coupled to a second input member of the epicyclic gear unit; and the booster compressor is coupled to an output member of the epicyclic gear unit, whereby the booster compressor is driveable by both the first shaft and the second shaft.

The output member of the epicyclic gear unit may be provided as a planet carrier, wherein the planet carrier holds the array of planet gears; the first input member of the epicyclic gear unit is an annular gear radially outwards of, and rotatably engaged with, an array of planet gears; the array of planet gears being radially outward of and rotatably engaged with the second input member; the second input member of the epicyclic gear unit being provided as a sun gear.

The output member of the epicyclic gear unit may be an annular gear radially outwards of, and rotatably engaged with, an array of planet gears; the first input member of the epicyclic gear unit is provided as a planet carrier, wherein the planet carrier holds the array of planet gears; the array of planet gears being radially outward of and rotatably engaged with the second input member; the second input member of the epicyclic gear unit being provided as a sun gear.

The diameters of the gears of the gear unit may be provided such that, in use, the booster compressor rotates in the same direction as the fan and, over a predetermined range of rotational speeds of the first and second shaft, the booster compressor rotates faster than the fan.

The turbo machine may comprise an engine core flow path, the booster compressor being provided at or downstream of an intake of the engine core flow path and the fan is provided upstream of the booster compressor.

The turbo machine further may comprise a bypass duct radially outward of engine core flow path.

The turbo machine may further comprise a high pressure turbine and a low pressure turbine, the second shaft being coupled to the high pressure turbine and the first shaft being coupled to the low pressure turbine.

The first shaft and second shaft may be configured, in use, to contra-rotate.

There may be provided a gas turbine engine comprising a fan and booster compressor system according to the present disclosure.

There is thus provided a system wherein the booster compressor is driven both at a higher rotational speed than the fan, and at a speed which is a function of both the fan speed and the high pressure shaft speed. This configuration enables generation of a high compression ratio whilst permitting smaller booster length and diameter, and hence overall smaller engine diameter, an improved off design aerodynamic match between the booster and high pressure compressors, and which keeps load on the low pressure shaft to a minimum compared to known devices.

BRIEF DESCRIPTION OF THE DRAWINGS

Examples of the present disclosure will now be described with reference to the accompanying drawings, in which.

DETAILED DESCRIPTION

Figures 1, 2:
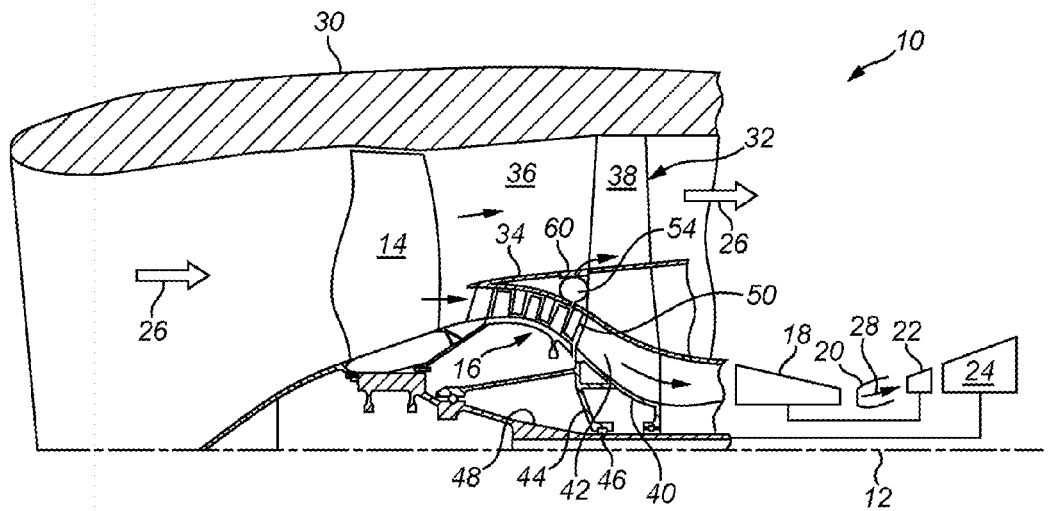
FIG. 1 shows a known booster arrangement for a gas turbine engine (as described in U.S. Pat. No. 7,624,581.
FIG. 2 is an arrangement described in U.S. Pat. No. 8,209,952.

For the avoidance of doubt, the reference numerals used in relation to features of the examples of the present disclosure shown in FIGS. 3 to 6 have no relation to the numbering system of the related art FIGS. 1 and 2.

Figure 3:
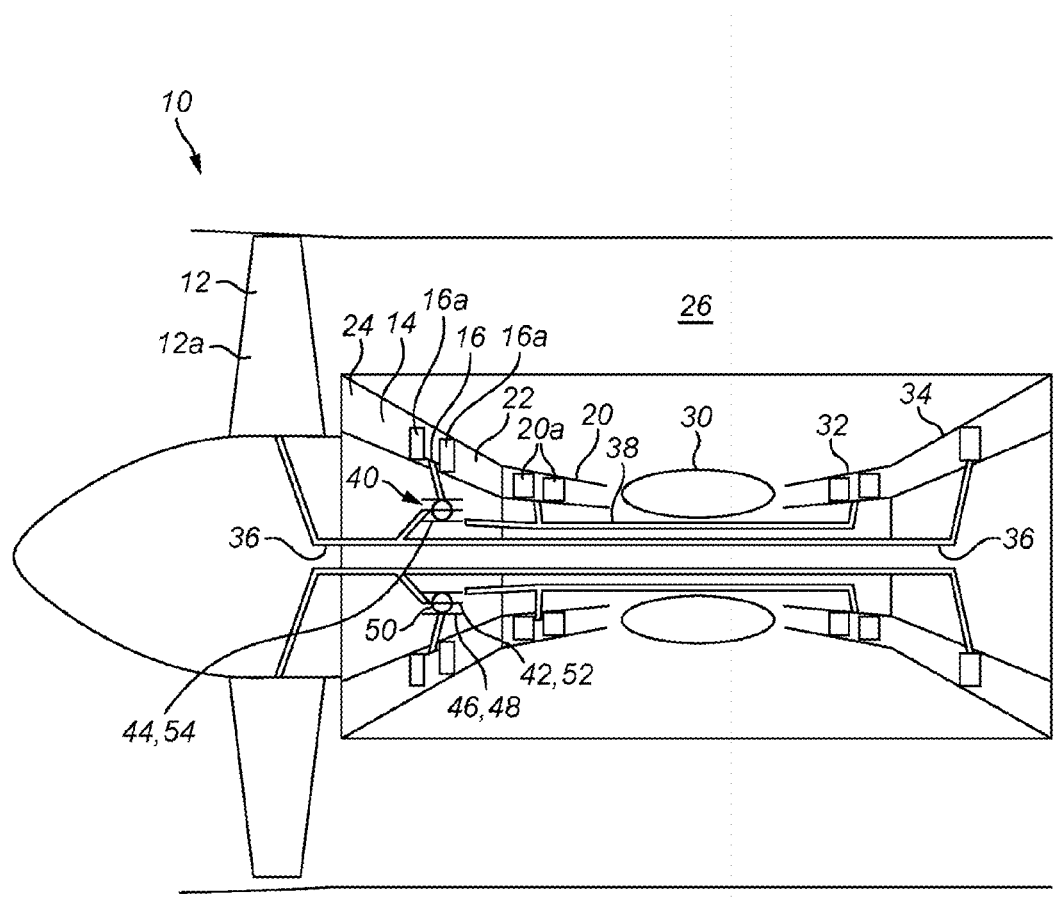
FIG. 3 is a diagrammatic representation of a gas turbine engine having a fan and low pressure compressor system according to the present disclosure.
Figure 4:
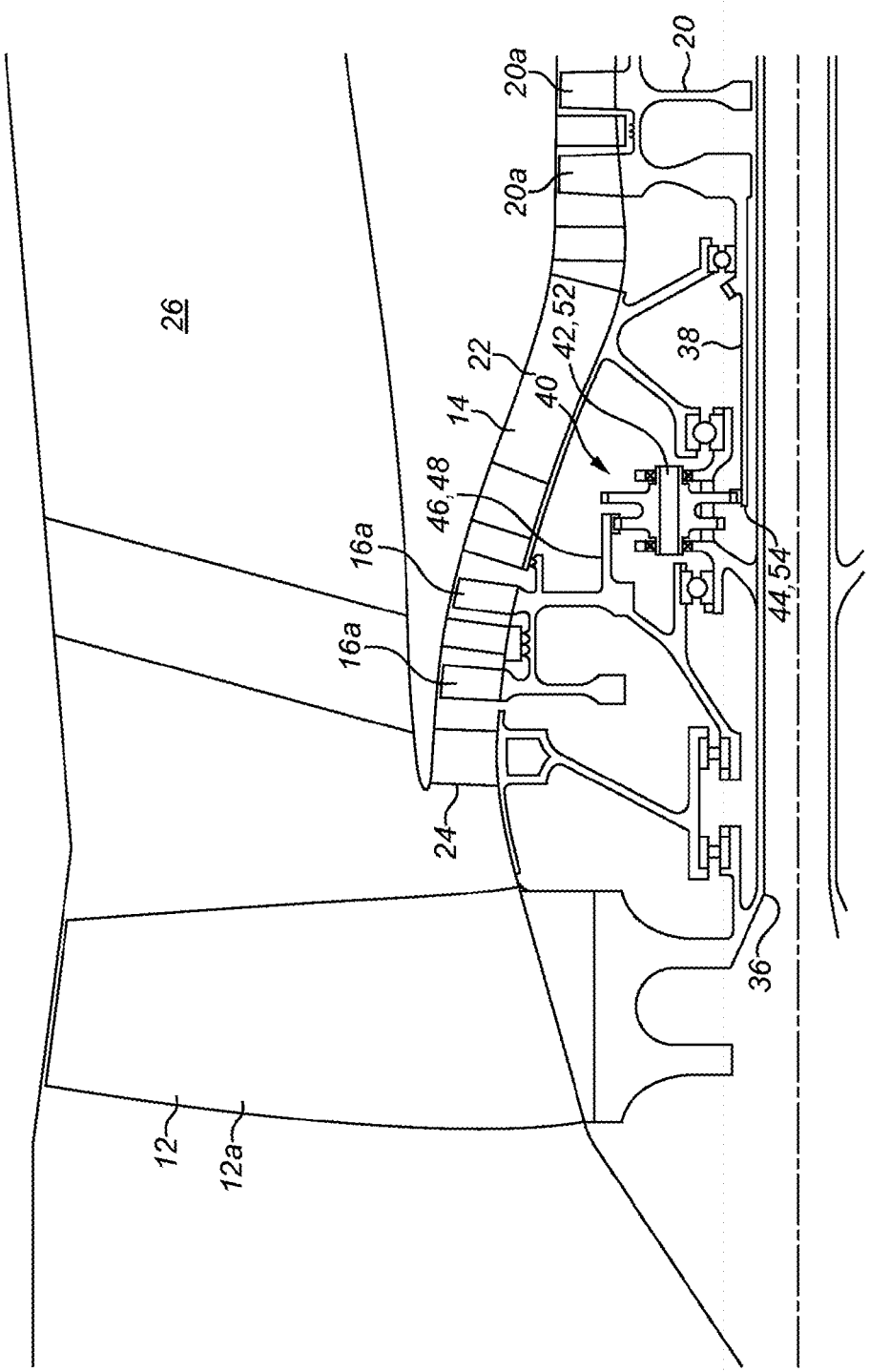
FIG. 4 shows a diagrammatic view of a fan and booster arrangement for a turbo machine according to the present disclosure.

FIG. 3 and FIG. 4 show a turbo machine 10 according to the present disclosure, for example a gas turbine engine. The gas turbine 10 comprises a fan 12 upstream of engine core flow path 14, the engine core flow path 14 defined by a booster compressor 16 and an additional high pressure compressor 20 spaced along a common duct 22. The fan 12, booster compressor 16 and high pressure compressor 20 each comprise at least one ring (i.e. array) of rotor blades 12a, 16a, 20a respectively. The booster compressor 16 may additionally comprise an array or arrays of stator vanes upstream, downstream and/or between the rotor stages 16a, 20a. The engine core flow path 14 has an intake 24 downstream of the fan 12. The booster compressor 16 is provided in the region of the intake 24 (that is to say at or downstream of the intake 24), and is also downstream of fan 12.

The turbo machine 10 further comprises a bypass duct 26 radially outward of the engine core flow path 14. The fan 12 spans the intake 24 and the bypass duct 26, and is operable to deliver air to both.

Downstream of the high pressure compressor 20 there is provided a combustor 30, a high pressure turbine 32 and a low pressure turbine 34. The fan 12 is coupled to a first shaft 36 which is in turn coupled to the low pressure turbine 34. The high pressure compressor 20 is coupled to a second shaft 38 which is in turn coupled to the high pressure turbine 32. The first shaft 36 and second shaft 38, in use, are contra-rotatable. That is to say, in use, the first shaft 36 and second shaft 38 rotate in opposite directions.

Figure 5:
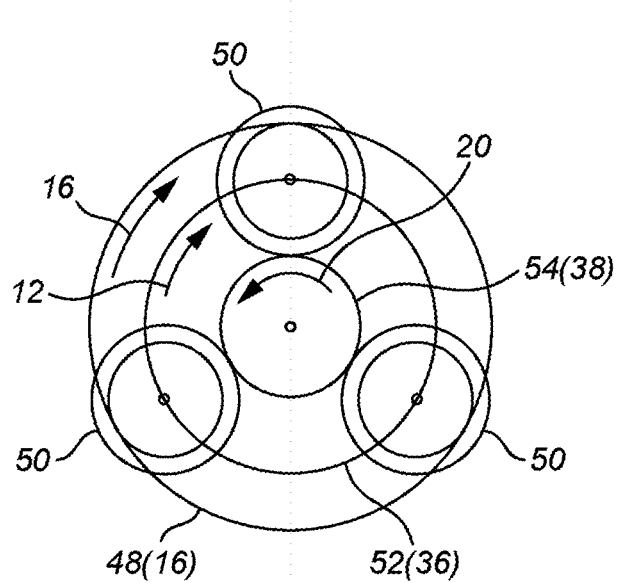
FIG. 5 is a diagrammatic cross-sectional view of an epicyclic gear arrangement of the present disclosure.
Figure 6:
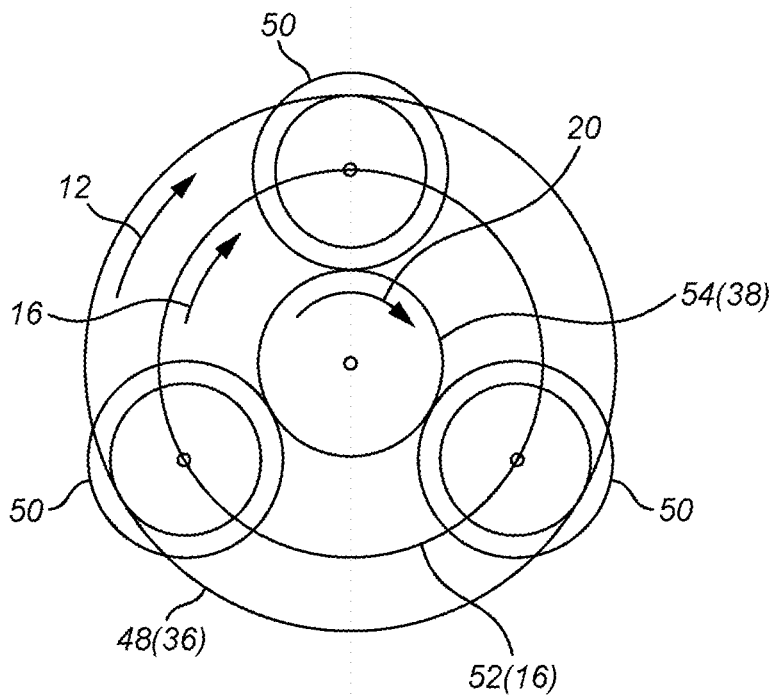
FIG. 6 is an alternative diagrammatic cross-sectional view of an epicyclic gear arrangement of the present disclosure.

There is also provided an epicyclic gear unit 40, alternative examples of which are shown in more detail in FIG. 5 and FIG. 6. The first shaft 36 is coupled to a first input member 42 of the epicyclic gear unit 40, the second shaft 38 is coupled to a second input member 44 of the epicyclic gear unit 40 and the booster compressor 16 is coupled to an output member 46 of the epicyclic gear unit 40.

In a first example shown in FIGS. 3 to 5, the output member 46 of the epicyclic gear unit 40 is an annulus (or "ring") gear 48 located radially outwards of and rotatably engaged with an array of planet gears 50. The first input member 42 of the epicyclic gear unit 40 is provided as a planet carrier 52, wherein the planet carrier 52 holds the array of planet gears 50. The array of planet gears 50 is radially outward of and rotatably engaged with the second input member 44. The second input member 44 of the epicyclic gear unit 40 is provided as a sun gear 54.

That is to say, in the examples of FIGS. 3 to 5, the first shaft (or "low pressure shaft") 36 is coupled to the planet carrier 52, the second shaft (or "high pressure shaft") 38 is coupled to the sun gear 54 and the rotor of the booster compressor 16 is coupled to the annulus gear 48. In FIG. 5 (and FIG. 6) the connection between the above components is indicated by the inclusion of the reference numerals of the booster 16, first shaft 36 and second shaft 38 in brackets next to the reference numerals of the planet carrier 52, annulus gear 48 and sun gear 54 as appropriate. Hence the booster compressor 16 is in rotatable engagement with and, in use, driven by the first (low pressure) shaft 36 and the second (high pressure) shaft 38, where the first (low pressure) shaft 36 and the second (high pressure) shaft 38, in use, rotate in opposite directions to one another. Thus, in FIG. 5, the fan 12 (coupled to the first/low pressure shaft 36) and booster compressor 16, are configured to rotate in the same direction in use, and the high pressure compressor 20 (coupled to the second/high pressure shaft 38) is configured to rotate in an opposite direction to the fan 12 and booster compressor 16 in use.

In an alternative example shown in FIG. 6, the first shaft (or "low pressure shaft") 36 is coupled to the annulus gear 48, the second shaft (or "high pressure shaft") 38 is coupled to the sun gear 54 and the rotor of the booster compressor 16 is coupled to the planet carrier 52. Hence the booster compressor 16 is in rotatable engagement with and, in use, driven by the first (low pressure) shaft 36 and the second (high pressure) shaft 38, where the first (low pressure) shaft 36 and the second (high pressure) shaft 38, in use, rotate in the same direction. Thus the high pressure compressor 20 (coupled to the second/high pressure shaft 38) and fan 12 (coupled to the first/low pressure shaft 36) and booster compressor 16, are configured to rotate in the same direction in use. Further examples of the device of the present disclosure may be configured such that a booster compressor is driven by both the low pressure and high pressure shafts via a differential gear arrangement.

The diameters of the sun gear 42, planet gears 44 and annulus gear 48 of the epicyclic gear unit 40 are provided such that, in use, the booster compressor 16 rotates in the same direction as the fan 12 and, over a predetermined range of rotational speeds of the first shaft 36 and second shaft 38, the booster compressor 16 rotates faster than the fan 12 and slower than the high pressure compressor. That is to say, the rotational speed of the booster compressor is intermediate between the speed of the fan and the speed of the high pressure compressor. The actual speed of the booster compressor is a function of both the speed of the low pressure shaft and the speed of the high pressure shaft combined with the geometric dimensions of the gears in the epicyclic arrangement.

Hence in operation of the fan and compressor system of the present disclosure, the arrangement is such that torque is supplied to drive the booster compressor 16 from both the first (low pressure) shaft 36 and the second (high pressure) shaft 38.

The proportion of torque extracted from each shaft 36,38 remains constant throughout the running range of the engine and is dictated by the diameters of the sun gear 42, planet gears 44 and annulus gear 48 of the epicyclic gear unit 40. Both the booster compressor speed and the torque split between the first (low pressure) shaft 36 and the second (high pressure) shaft 38 may be optimised for a particular design of engine by changing the diameters of the sun gear 42, planet gears 44 and annulus gear 48 of the epicyclic gear unit 40.

Although the preceding examples are described with reference to an epicyclic gear unit, any appropriate differential gear unit may be used as an alternative.

The device of the present disclosure provides the advantage that the booster compressor may achieve a higher rotational speed, which reduces the number of low pressure and/or high pressure stages required to achieve the desired high pressure ratio, which thus reduces the required length and weight of the engine. Additionally the diameter of the booster compressor need not be as large as for a conventional booster arrangement.

The device permits the work split between the low and high pressure shafts to be optimised more flexibly within overall component mechanical and aero design constraints.

The consequential reduced booster compressor diameter allows the shape of the duct between the booster and high pressure compressor to be made more aerodynamic, thus reducing pressure loss in the duct.

Off-design matching of the engine can also be improved, reducing off-design specific fuel consumption. The booster speed is a function of both the low pressure and high pressure shaft speeds and this function can be optimised to better match the compressor speeds at off design conditions.

Lower booster compressor diameter also reduces fan hub diameter and hence reduces fan tip diameter for a given flow area and thus powerplant drag when used on an aircraft.

Torque load for the low pressure shaft is reduced, permitting smaller diameter shaft and so lighter weight high pressure discs.

The increased work per stage in the booster will also increase the air temperature downstream of the first or only rotor stage of the booster, and hence eliminate the need for anti-icing of the downstream compressor stators.

Also, since the booster diameter is reduced, the Hade angle at fan inner may be reduced, and hence the outer diameter at fan exit and the bypass duct diameter can be lower than for a conventional arrangement. This allows for a further reduction in nacelle outer diameter and weight.

The greater flexibility offered by the device to optimise the engine design enables the desired engine performance to be achieved using more conventional proven technologies which will reduce development risk and cost.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A compressor system for a turbo machine, the turbo machine including (1) a low pressure shaft coupled to a low pressure turbine; and (2) a high pressure shaft coupled to a high pressure turbine, the compressor system comprising:
   a fan driven by the low pressure turbine via the low pressure shaft;
   a booster compressor; and
   an epicyclic gear unit;
   wherein:
      the low pressure shaft is coupled to a first input member of the epicyclic gear unit,
      the high pressure shaft is coupled to a second input member of the epicyclic gear unit,
      the booster compressor is coupled to an output member of the epicyclic gear unit,
      the booster compressor is driven by the low pressure shaft and the high pressure shaft, and
      a proportion of a torque extracted from each of the low pressure shaft and the high pressure shaft remains constant throughout a running range of the turbo machine.

2. The compressor system as claimed in claim 1, wherein:
   the output member of the epicyclic gear unit is provided as a planet carrier, the planet carrier holding an array of planet gears,
   the first input member of the epicyclic gear unit is an annular gear positioned radially outward of, and rotatably engaged with, the array of planet gears,
   the array of planet gears is positioned radially outward of, and rotatably engaged with, the second input member of the epicyclic gear unit, and
   the second input member of the epicyclic gear unit is provided as a sun gear.

3. The compressor system as claimed in claim 2, wherein diameters of gears of the epicylic gear unit are provided such that, in use, the booster compressor rotates in a same direction as the fan and, over a predetermined range of rotational speeds of the low pressure shaft and the high pressure shaft, the booster compressor rotates faster than the fan.

4. The compressor system as claimed claim 1, wherein:
the output member of the epicyclic gear unit is an annular gear positioned radially outward of, and rotatably engaged with, an array of planet gears,
the first input member of the epicyclic gear unit is provided as a planet carrier, the planet carrier holding the array of planet gears,
the array of planet gears is positioned radially outward of, and rotatably engaged with, the second input member of the epicyclic gear unit, and
the second input member of the epicyclic gear unit is provided as a sun gear.

5. The compressor system as claimed in claim 4, wherein the low pressure shaft and high pressure shaft are configured, in use, to contra-rotate.

6. The compressor system as claimed in claim 4, wherein diameters of gears of the epicyclic gear unit are provided such that, in use, the booster compressor rotates in a same direction as the fan and, over a predetermined range of rotational speeds of the low pressure shaft and the high pressure shaft, the booster compressor rotates faster than the fan.

7. The compressor system as claimed in claim 1, wherein:
the turbo machine comprises an engine core flow path,
the booster compressor is provided one of at or downstream of an intake of the engine core flow path, and
the fan is provided upstream of the booster compressor in the engine core flow path.

8. The compressor system as claimed claim 7, wherein the turbo machine further comprises a bypass duct positioned radially outward of the engine core flow path.

9. A gas turbine engine, comprising:
a turbo machine comprising:
a low pressure shaft coupled to a low pressure turbine; and
a high pressure shaft coupled to a high pressure turbine; and
a compressor system comprising:
a fan driven by the low pressure turbine via the low pressure shaft;
a booster compressor; and
an epicyclic gear unit;
wherein:
the low pressure shaft is coupled to a first input member of the epicyclic gear unit,
the high pressure shaft is coupled to a second input member of the epicyclic gear unit,
the booster compressor is coupled to an output member of the epicyclic gear unit,
the booster compressor is driven by the low pressure shaft and the high pressure shaft, and
a proportion of a torque extracted from each of the low pressure shaft and the high pressure shaft remains constant throughout a running range of the gas turbine engine.

10. The gas turbine engine as claimed in claim 8, wherein:
the output member of the epicyclic gear unit is provided as a planet carrier, the planet carrier holding an array of planet gears,
the first input member of the epicyclic gear unit is an annular gear positioned radially outward of, and rotatably engaged with, the array of planet gears,
the array of planet gears is positioned radially outward of, and rotatably engaged with, the second input member of the epicyclic gear unit, and
the second input member of the epicyclic gear unit is provided as a sun gear.

11. The gas turbine engine as claimed in claim 10, wherein diameters of gears of the epicylic gear unit are provided such that, in use, the booster compressor rotates in a same direction as the fan and, over a predetermined range of rotational speeds of the low pressure shaft and the high pressure shaft, the booster compressor rotates faster than the fan.

12. The gas turbine engine as claimed in claim 9, wherein:
the output member of the epicyclic gear unit is an annular gear positioned radially outward of, and rotatably engaged with, an array of planet gears,
the first input member of the epicyclic gear unit is provided as a planet carrier, the planet carrier holding the array of planet gears;
the array of planet gears is positioned radially outward of, and rotatably engaged with, the second input member of the epicyclic gear unit; and
the second input member of the epicyclic gear unit is provided as a sun gear.

13. The gas turbine engine as claimed in claim 12, wherein the low pressure shaft and high pressure shaft are configured, in use, to contra-rotate.

14. The gas turbine engine as claimed in claim 12, wherein diameters of gears of the epicylic gear unit are provided such that, in use, the booster compressor rotates in a same direction as the fan and, over a predetermined range of rotational speeds of the low pressure shaft and the high pressure shaft, the booster compressor rotates faster than the fan.

15. The gas turbine engine as claimed in claim 9, further comprising an engine core flow path,
wherein:
the booster compressor is provided one of at or downstream of an intake of the engine core flow path, and
the fan is provided upstream of the booster compressor in the engine core flow path.

16. The gas turbine engine as claimed in claim 15, further comprising a bypass duct positioned radially outward of the engine core flow path.

* * * * *